US006925942B2

(12) United States Patent
Yokomori

(10) Patent No.: US 6,925,942 B2
(45) Date of Patent: Aug. 9, 2005

(54) CONTROL METHOD OF SLIDING A VEHICLE DOOR BY A POWERED SLIDING DEVICE

(75) Inventor: Kazuhito Yokomori, Yamanashi-ken (JP)

(73) Assignee: Mitsui Kinzoku Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/284,445

(22) Filed: Oct. 31, 2002

(65) Prior Publication Data

US 2004/0012903 A1 Jan. 22, 2004

(30) Foreign Application Priority Data

Oct. 31, 2001 (JP) ....................................... 2001-335299

(51) Int. Cl.[7] .................................................. B60N 5/00

(52) U.S. Cl. ......................... 105/332; 180/271; 49/300; 49/506

(58) Field of Search ................................. 105/332, 333, 105/341, 348; 280/271, 282; 701/70; 49/300, 280, 506; 303/6.1; 361/51, 115; 180/274

(56) References Cited

U.S. PATENT DOCUMENTS 5,975,231 A * 11/1999 Hirato ........................ 180/274
6,287,236 B1 * 9/2001 Ishikawa ...................... 477/71
6,359,762 B1 * 3/2002 Yokomori .................... 361/51
6,601,669 B1 * 8/2003 Agnew ....................... 180/275

FOREIGN PATENT DOCUMENTS

DE 2002390643 A1 * 6/1999

OTHER PUBLICATIONS

Song, CY, 2002–390643, Door locking control device of vehicle and method of the same, Jun. 1999, p. 1.*

* cited by examiner

*Primary Examiner*—Frantz F. Jules
(74) *Attorney, Agent, or Firm*—Browdy and Neimark, P.L.L.C.

(57) ABSTRACT

A control method of a powered sliding device for a vehicle sliding door, wherein when an operating switch for starting a powered sliding device is pressed to open the door, and if the vehicle speed is about 3 km/h or less and the foot brake or the parking brake is operated, the decelerating state of the vehicle just before is confirmed, and when the decelerating state does not correspond to the quick braking, the powered sliding device is started.

2 Claims, 4 Drawing Sheets

CONTROL METHOD OF SLIDING A VEHICLE DOOR BY A POWERED SLIDING DEVICE

BACKGROUND OF THE INVENTION

1. Field of the Invention

The present invention relates to a control method of a powered sliding device for a vehicle sliding door.

2. Description of the Related Art

Conventionally, a powered sliding device for a vehicle sliding door where the sliding door is slid in the door closing direction and in the door opening direction by rotating a wire drum connected through a wire cable to a sliding door with the power of a motor is well known.

The sliding device is started by the operation of one or a plurality of operating switches provided in the vehicle, and opens and closes the sliding door. Therefore, the counter measure for the erroneous operation of the operating switch which may happen during the vehicle running is necessary. In the vehicle to North America, it is set that the door opening operation of the sliding door is prohibited except when the shift lever of the automatic transmission is positioned at the parking position. This operating condition of the sliding device is excellent in terms of the safety, but is low in terms of the convenience. For example, even if the vehicle is completely stopped by the foot brake, the movement of the sliding door by the powered sliding device cannot be performed when the shift lever is positioned in the drive position.

In order to remove the inconvenience, a control method is also proposed, where the door opening operation of the powered sliding device is permitted when the foot brake or the parking brake (hand brake) is operated and the stopping of the vehicle is confirmed. Furthermore, at low speeds it is difficult to instantly and accurately determine when a vehicle has come to a complete stop, and therefore, in the trade, the vehicle speed of about 3 km/h or less is regarded as the stopping of the vehicle.

The problem of the control method is that it is impossible to prevent the erroneous start of the sliding device when the wheel is locked. For example, on the snowy road or the icy road, there are some cases where the wheel is easily locked by the foot brake operation. In this state, if the operating switch is erroneously operated, the sliding device is started and the sliding door is opened. Furthermore, at the vehicle spinning, there is such a risk that erroneous detection of the vehicle speed may happen. Furthermore, at the vehicle spinning, such a risk that the person in the vehicle erroneously touches the operating switch is increased.

SUMMARY OF THE INVENTION

Therefore, it is an object of the present invention to provide a control method wherein at a vehicle speed of about 3 km/h or less, even if the foot brake or the parking brake is operated, the door opening operation of the sliding device is prohibited when the erroneous detection of the vehicle speed because of the lock of the wheel is expected, so that the convenience and the safety of the sliding device can be ensured.

DESCRIPTION OF THE PREFERRED EMBODIMENT

Figure 1:
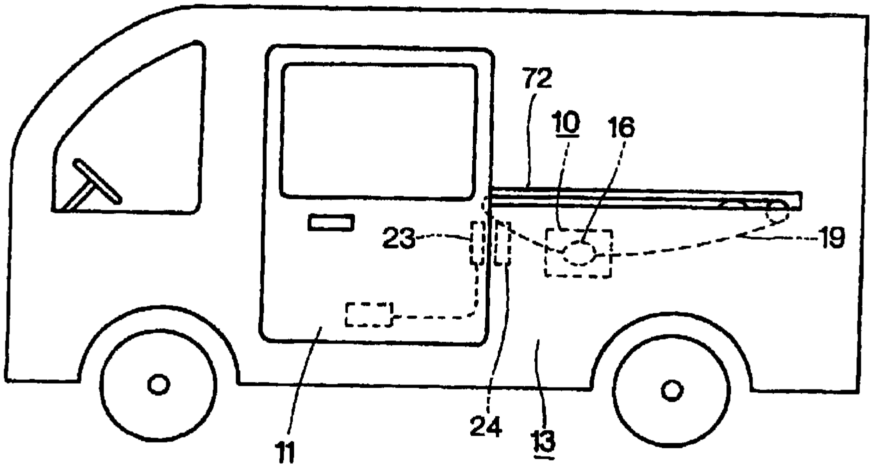
FIG. 1 is a side view of a vehicle with a powered sliding device and a sliding door.
Figure 2:
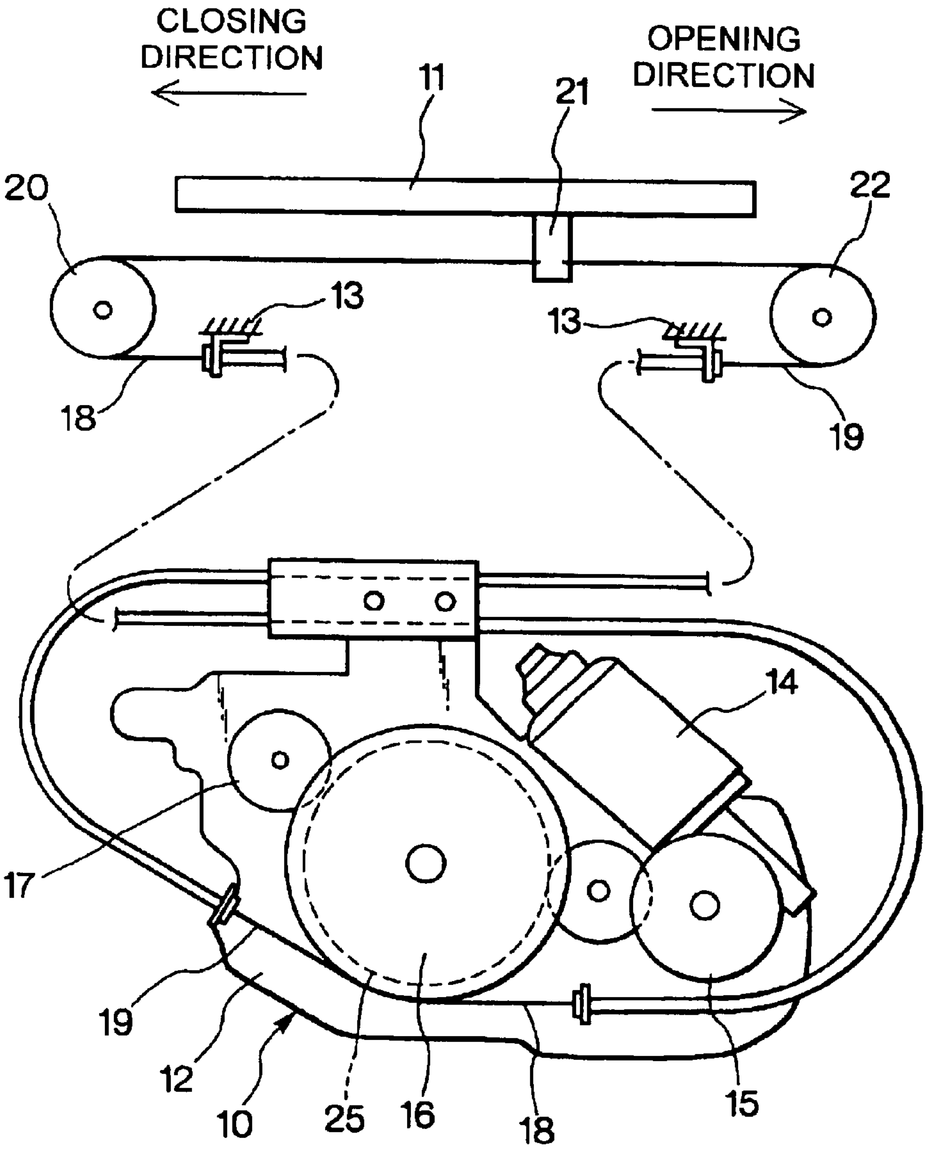
FIG. 2 is an expanded view of the sliding device and the sliding door.

One embodiment of the present invention will be described by using drawings. FIG. 1 shows the rough relation between a powered sliding device 10 according to the present invention and a vehicle sliding door 11 which slides in the door closing direction and in the door opening direction by the powered sliding device 10, and FIG. 2 shows the expanded relation between the two.

The sliding door 11 is slidably attached to a vehicle body 13, and is slidable in the back and forth direction of the vehicle body 13 along a guide rail 72 provided to the vehicle body 13. A base plate 12 of the powered sliding device 10 is fixed to the vehicle body 13, and to the base plate 12, a motor 14, a reduction mechanism 15, a wire drum 16, and an electromagnetic brake 17 are provided. The electromagnetic brake 17 is operated by the electric control, and applies braking to the wire drum 16.

To the wire drum 16, one end sides of two wire cables 18, 19 are connected. The other end side of the first wire cable 18 is connected to a bracket 21 of the sliding door 11 through a front pulley 20 pivoted to the vehicle body 13. Similarly, the other end side of the second wire cable 19 is connected to the bracket 21 through a rear pulley 22 pivoted to the vehicle body 13.

Between the reduction mechanism 15 and the wire drum 16, a clutch mechanism 25 is provided, and the rotation of the motor 14 is transmitted to the wire drum 16 through the reduction mechanism 15 and the clutch mechanism 25. The structure of the clutch mechanism 25 is free. For example, it is possible to use an electromagnetic clutch which can switch the state between the motor 14 and the wire drum 16 to the connected state and the disconnected state by the action of an electromagnet, or a clutch which is switched to the connected state when the motor 14 rotates and is switched to the disconnected state when the motor 14 stops, or a clutch which is switched to the connected state by the rotation of the motor 14 but which can keep the connected state even if the motor 14 is stopped, or the like (refer to U.S. Pat. No. 6,359,762).

When the wire drum 16 rotates clockwise by the power of the motor 14, the first wire cable 18 is wound up and at the same time, the second wire cable 19 is pulled out, and the sliding door 11 slides in the door closing direction, and by the counterclockwise rotation of the wire drum 16, the second wire cable 19 is wound up and at the same time, the first wire cable 18 is pulled out, and the sliding door 11 slides in the door opening direction.

To the sliding door 11, a latch assembly 23 is attached, which keeps the sliding door 11 in the door closing position by being engaged with a striker 24 fixed to the vehicle body 13. The engagement between the latch assembly 23 and the striker 24 can be canceled by a powered releasing device 39.

Figure 3:
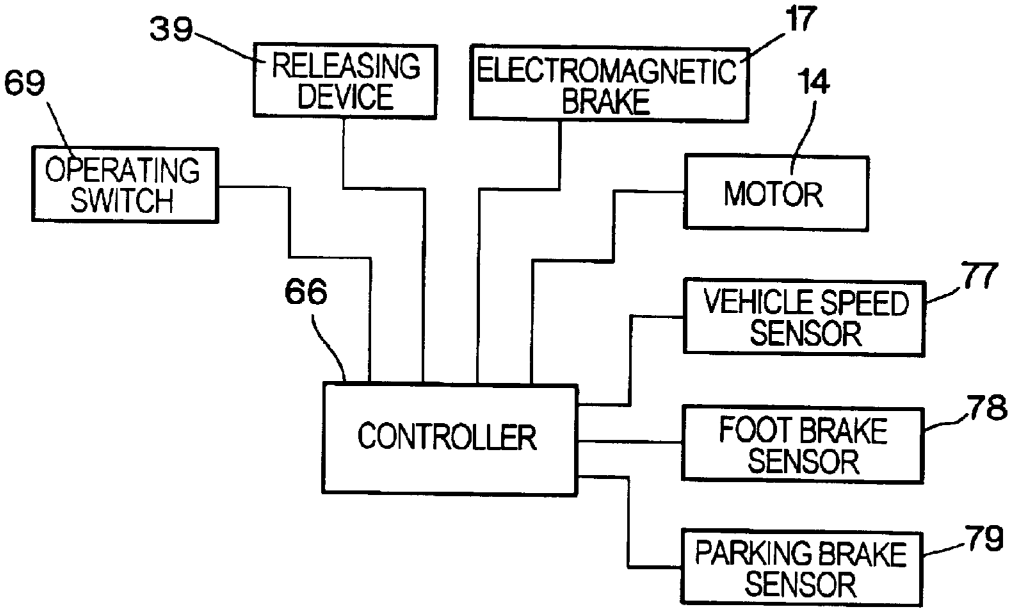
FIG. 3 is a block diagram for performing the control operation of the present invention.

FIG. 3 is a block diagram for performing the control operation according to the present invention. The block diagram has a controller 66, an operating switch 69, a vehicle speed sensor 77, a foot brake sensor 78, and a parking brake sensor 79.

OPERATION

Figure 4:
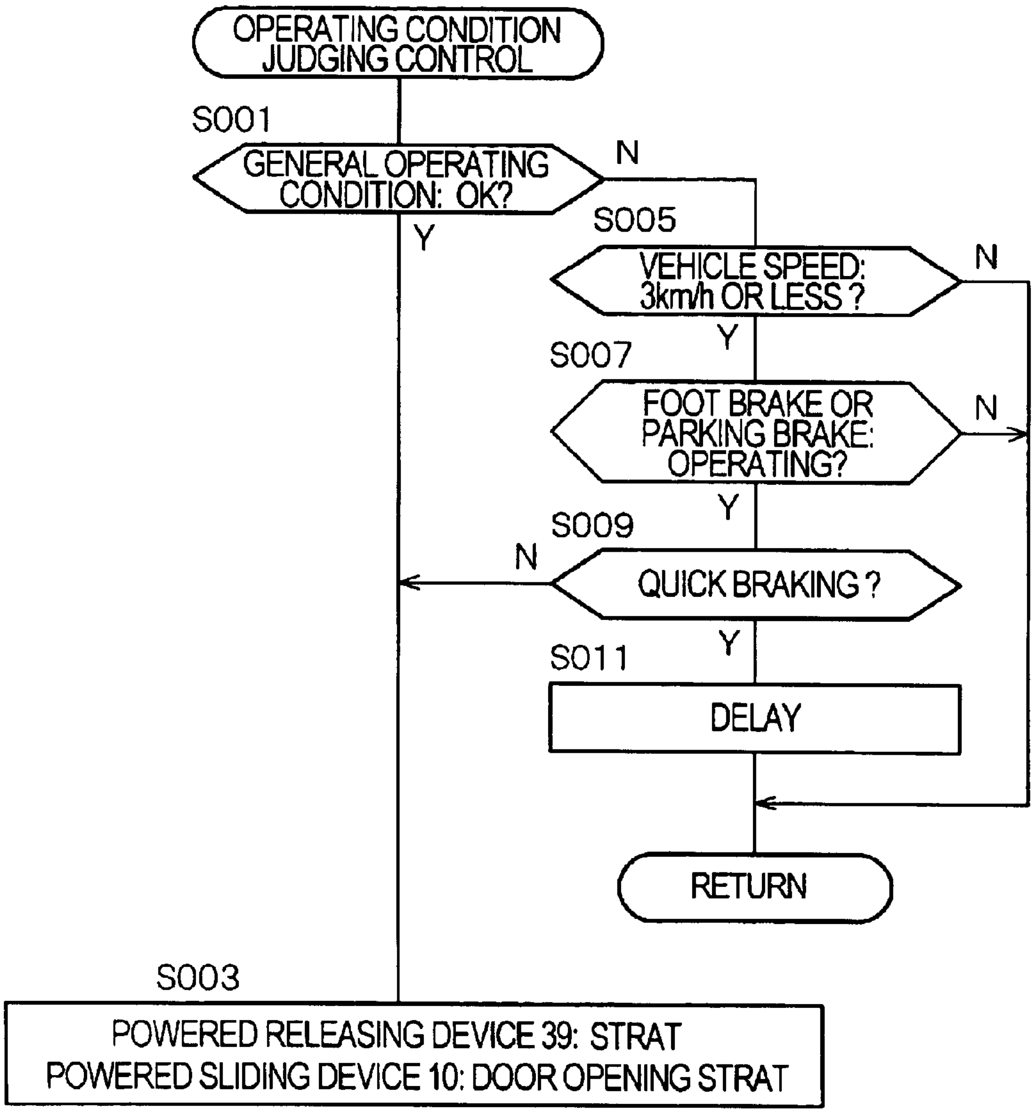
FIG. 4 is a flow chart showing the operating condition judging control of the present invention.

When the sliding door 11 is positioned in the door closing position, if the operating switch 69 is pressed to open the door, the operating condition judging control of the powered sliding device 10 shown in FIG. 4 is performed, and first, the controller 66 performs the general operating condition judgment based on the general operating condition to be set at the special request (S001), and when the condition is fulfilled, it operates the powered releasing device 39 to release the latch assembly 23 from the striker 24, and starts the powered sliding device 10 in the door opening direction, and slides the sliding door 11 in the door opening direction (S003). As the general operating condition, the positional confirmation of the shift lever of the automatic transmission or the like can be mentioned.

When the general operating condition is not fulfilled, the controller 66 confirms the vehicle speed by the vehicle speed sensor 77 (S005). When the vehicle running state where the vehicle speed exceeds 3 km/h is detected, the powered sliding device 10 is not started even if the operating switch 69 is operated.

When the vehicle stopping state where the vehicle speed is 3 km/h or less is detected, the operating state of the foot brake and the parking brake is confirmed by the foot brake sensor 78 and the parking brake sensor 79 (S007), and when neither is operated, the powered sliding device 10 is not started regardless of the operation of the operating switch 69. When the operating state of the foot brake or the parking brake is detected, the decelerating state of the vehicle when the operating switch 69 is pressed is confirmed (S009), and when the decelerating state corresponds to the quick braking, the vehicle speed of about 3 km/h or less detected at the step 005 is regarded as an erroneous detection because of the lock of the wheel or the like, and the powered sliding device 10 is not started regardless of the operation of the operating switch 69. Furthermore, when a quick braking is detected, the starting of the sliding device 10 by the operating switch 69 is made invalid for a predetermined time (about 3 second) after that (S011).

When the quick braking is not detected, it is regarded as the actual vehicle stopping or the running at a speed of no problem in the safety, and the powered releasing device 39 is operated to release the latch assembly 23 from the striker 24, and the powered sliding device 10 is started in the door opening direction to slide the sliding door 11 in the door opening direction (S003).

Furthermore, the quick braking of the vehicle is found from the detected vehicle speed from the vehicle speed sensor 77. As one example, the case where the vehicle speed is reduced by about 40 km/h or more within one second just before the pressing of the operating switch 69 can be regarded as the quick braking.

ADVANTAGE

As mentioned above, according to the control method of the present invention, the erroneous detection of the vehicle speed because of the lock of the wheel or the like can be prevented, and therefore, the safety and the convenience of the powered sliding device 10 is improved.

What is claimed is:

1. A control method of a powered sliding device for a vehicle sliding door, comprising the steps of:

initiating operation of a controller by pressing an operating switch;

confirming a decelerating state of a vehicle by a vehicle speed sensor linked to the controller before a release device for starting the powered sliding device is operated to open the door but only if the vehicle speed sensor determines a vehicle speed is about 3 km/h or less and that a foot brake sensor and a parking brake sensor linked to the controller respectively determine whether a foot brake or a parking brake is in operation; and if so, starting the release device to operate the powered sliding device, when the decelerating state corresponds to a predetermined normal braking of the foot brake or parking brake but not to a predetermined quick braking of the foot brake or the parking brake.

2. The control method of a powered sliding device for a vehicle sliding door according to claim 1, wherein starting of the powered sliding device by the release device is made invalid for a predetermined time, when the decelerating state corresponds to quick braking.

* * * * *